(12) United States Patent
Perotti et al.

(10) Patent No.: US 7,146,346 B2
(45) Date of Patent: Dec. 5, 2006

(54) FUZZY-LOGIC ON BOARD DEVICE FOR MONITORING AND PROCESSING MOTOR VEHICLE OPERATING DATA

(76) Inventors: Matteo Perotti, Via Gorizia 4, Como (IT) 22100; Gabriele Bomba, Via Martinetti, 9 Milano (IT) 20147

( * ) Notice: Subject to any disclaimer, the term of this patent is extended or adjusted under 35 U.S.C. 154(b) by 639 days.

(21) Appl. No.: 10/172,145

(22) Filed: Jun. 14, 2002

(65) Prior Publication Data
US 2003/0023568 A1 Jan. 30, 2003

(30) Foreign Application Priority Data
Jun. 18, 2001 (IT) .......................... MI2001A1238

(51) Int. Cl.
*G06N 7/00* (2006.01)
*G06F 11/30* (2006.01)
(52) U.S. Cl. .......................... 706/4; 701/301
(58) Field of Classification Search .................. 706/1, 706/10, 14, 62, 902, 905, 4; 701/1, 27, 40, 701/4
See application file for complete search history.

(56) References Cited

U.S. PATENT DOCUMENTS

| | | |
|---|---|---|
| 5,414,645 A | 5/1995 | Hirano |
| 5,499,182 A | 3/1996 | Ousborne |
| 5,805,079 A | 9/1998 | Lemelson |
| 5,983,161 A * | 11/1999 | Lemelson et al. .......... 701/301 |

FOREIGN PATENT DOCUMENTS

| | | |
|---|---|---|
| EP | 0 863 490 A2 | 9/1998 |
| WO | WO 00/60547 | 10/2000 |

OTHER PUBLICATIONS

Carlos A. Coello, An Updated Survey of GA-Based Multiobjective Optimization Techniques, 2000, ACM Computing Surveys, vol. 32, No. 2, Jun. 2000.*
Rahul Sukthankar, Situation Awareness for Tactical Driving, 1997, CMU-RI-TR-97-08.*

* cited by examiner

*Primary Examiner*—Ramesh Patel
*Assistant Examiner*—Nathan H. Brown, Jr.
(74) *Attorney, Agent, or Firm*—Young & Thompson (57) ABSTRACT

A fuzzy-logic on-board device for motoring and processing motor vehicle operating data comprising a on-board network connector, a front-end device, a CPU, an integrated store, a power management system and a peripheral device interface connector.

31 Claims, 9 Drawing Sheets fig. 1 fig 2 fig 3 fig. 4 fig. 5 fig. 6 fig. 7 fig 8 fig 9

FUZZY-LOGIC ON BOARD DEVICE FOR MONITORING AND PROCESSING MOTOR VEHICLE OPERATING DATA

BACKGROUND OF THE INVENTION

The present invention relates to an electronic built-in on-board device, of a fuzzy-logic type, which has been specifically designed for monitoring, storing, processing and clustering data related to the operation of motor vehicles said device is applied to.

The involved data can comprise parameters related to the operation of the motor vehicle in general, or an operating sub-system thereof.

As is known, a very important requirement to be met in the motor vehicle and/or maintenance field, is that of providing on-board systems, specifically designed for collecting and processing data related to the operation of the motor vehicle, to optimize the system size and specifications of the single components of the motor vehicle and monitor their operation depending on their actual use.

Prior technologic solutions to meet the above mentioned requirements, provide a low processing capability, require a lot of preset parameters and dedicated sensors, to be properly installed on the motor vehicle.

Said prior systems are moreover affected by further drawbacks: for example they continuously record operating additional data, to provide redundant data packets, or preset sampling frequencies and times, which are fixed and/or limited by the store size requirements, thereby cannot be considered as fully autonomous, since a continuous monitoring through the overall operation time, or an implementation of dedicated or specifically designed sensors on the motor vehicle are required.

Moreover, a specifically designed connecting system is also required, thereby the motor vehicle on-board electric system must be properly modified to derive therefrom the power supply for the measurement and sensor system.

The above negatively affects the reliability of the motor vehicle and monitoring system thereof.

A further drawback to be also considered is the high cost of the storing system, sensors, managing medium and control units.

SUMMARY OF THE INVENTION

Accordingly, the aim of the present invention is to provide such an electronic device adapted to overcome the above mentioned problems, i.e. to properly record and process operating data of the motor vehicle the device is installed on, and cooperate, in a fully compatible manner, with onboard networks and systems, as well as properly poll electronic dedicated control units (ECU's) controlling motor vehicles.

The above mentioned aim is achieved by an electronic microprocessor control unit, and a related software procedure, providing, based on fuzzy-logic principles, a full analysis of said operating data for deriving therefrom statistic index arrangements, thereby providing a control unit having a fully autonomous operating data managing capability.

Such an inventive control unit or device, in particular, can be integrated on the on-board ECU's, so as to process data of said ECU's and provide said ECU's, in an interactive manner, with control data flows.

Thus, the invention provides a lot of useful applications, such as:

an identification of the user type, to optimize the designing of the motor vehicle and sub-systems thereof; a monitoring of the ageing status of the motor vehicle components, such as: tires, dampers, lubricating oil; an optimization of the motor vehicle use (which would be very useful for motor vehicle like that which could be performed by a fleet control applications) to provide information about the motor vehicle wear conditions useful on used motor vehicle market; a possibility of easily performing any derived risk analysis to be used by insurance companies for optimizing the cost rate and providing rate savings; and a recording of data related to the last operation of the motor vehicle, to provide diagnostic functions and the like.

Within the scope of the above mentioned aim, a further object of the present invention is to derive in real time data related to the motor vehicle use mode from a plurality of on-board sensors coupled to respective dedicated electronic control units or ECU's, for providing integration and full compatibility with on-board networks, and achieving, from the thus processed data, a so-called "DNA", i.e. a statistic parameter array, providing a synthetic operation frame characterizing the use pattern of the motor vehicle.

Yet another object of the present invention is to statistically process, in a fully autonomous manner, all the operation data and to return to the on-board ECU's further operating data related to motor vehicle sub-system operation.

Yet another object of the present invention is to provide such a device which is very reliable and safe in operation.

Yet another object of the present invention is to provide such a device which is very advantageous from a mere economic standpoint.

According to one aspect of the present invention, the above mentioned aim and objects, as well as yet other objects, which will become more apparent hereinafter, are achieved by a fuzzy-logic on-board device for monitoring and processing motor vehicle operating data according to the accompanying claims.

BRIEF DESCRIPTION OF THE DRAWINGS

Further characteristics and advantages of the present invention will become more apparent hereinafter, from the following detailed disclosure of a preferred, though not exclusive, embodiment thereof, which is illustrated, by way of an indicative, but not limitative, example, in the accompanying drawings, where.

DESCRIPTION OF THE PREFERRED EMBODIMENTS

Figure 1:
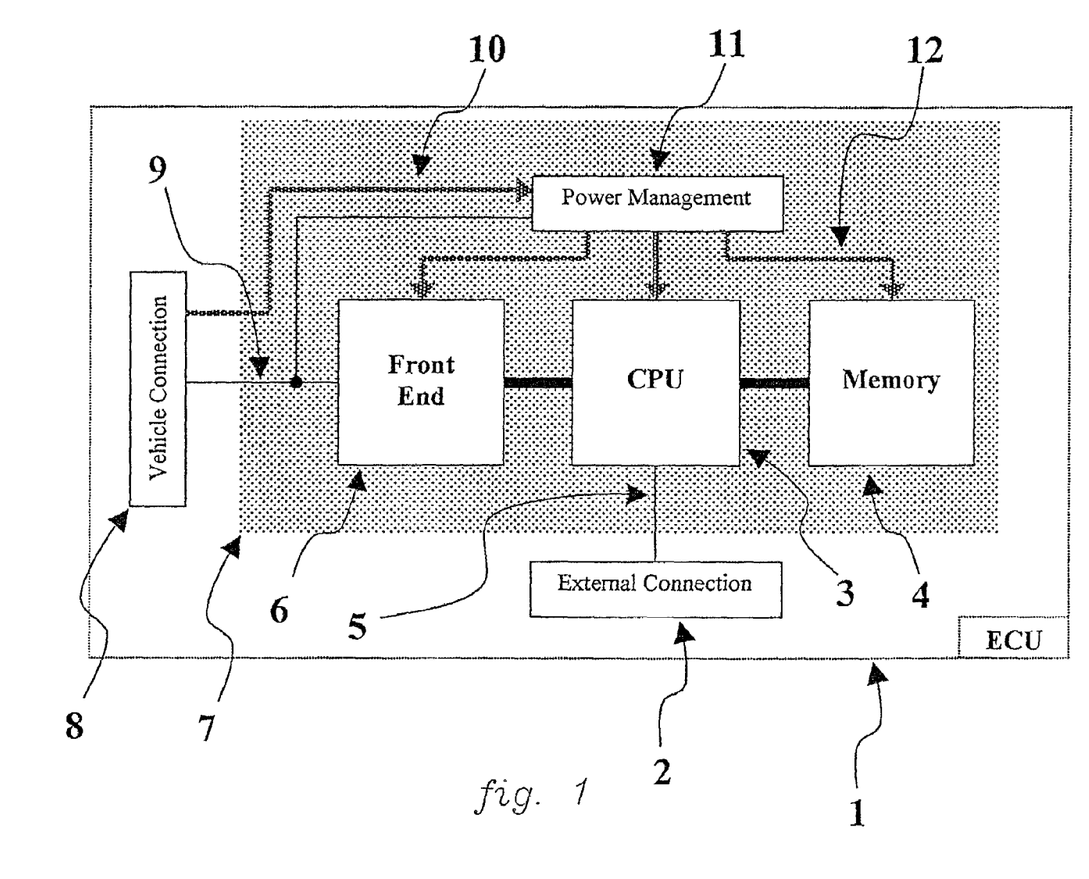
FIG. 1 is a constructional and functional block diagram of the device according to the present invention.

With reference to the number references of the above mentioned figures, the fuzzy-logic on-board device for monitoring and processing motor vehicle operating data, according to the present invention, and which is generally indicated by the reference number 1, comprises an on-board network connector 8, a front-end device 6, a CPU 3, an integrated store 4, a power management system 11, and a peripheral device interface connector 2.

The CPU 3 is preferably a microchip, PIC16F877P model, microcontroller, operating to adjust and control the data flow and store related control data in store means of the device according to the present invention as well as process the acquired data flow analysis algorithms.

The integrated store 4 preferably comprises a commercially available RAM store, of a 64 Kbyte static type, including buffer or backup battery means.

Figure 8:
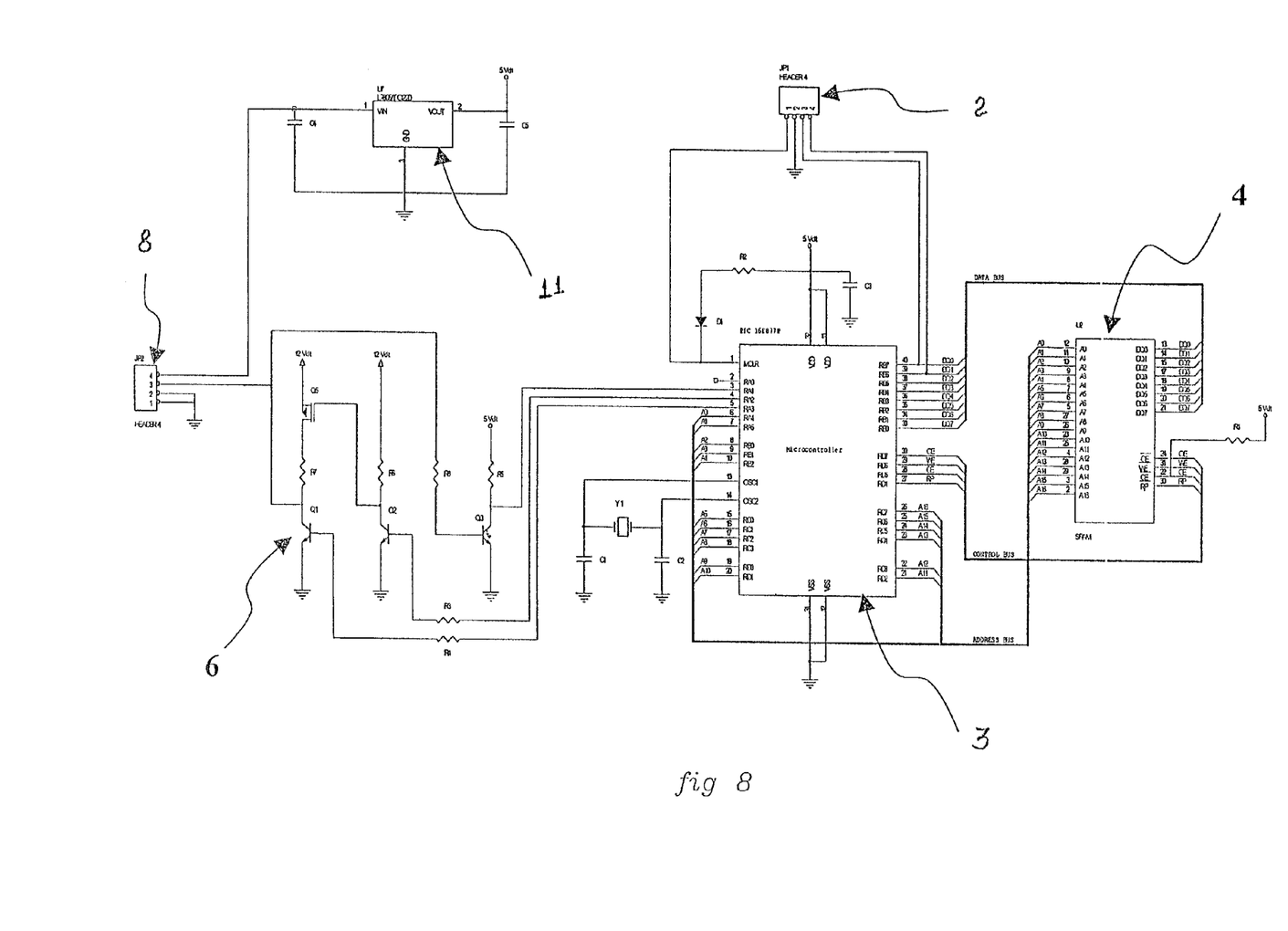
FIG. 8 illustrates an electric circuit used in the device according to the present invention.

The front end device 6 comprises preferably BJT transistors, of a NPN type, indicated by Q1, Q2, Q3, and at least a MOS transistor, and is designed to match the electric level characteristics of the motor vehicle on-board networks the device according to the invention is coupled to, which networks can be of a CAN, TTP, or a direct connection type, for example a K-line.

The power management system 11 preferably comprises an integrated stabilizer power regulating device of a 7805 type, which is power supplied through the on-board network connector 8 and the inlet line 10, directly from the vehicle power supply circuit and operates to provide the front-end device 6, CPU 3 and store 4, with a regulated or stabilized 5-volt power supply, through the power supply lines 12.

As shown the CPU 3 is connected through a bus 13 to the front end device 6 and, through a further bus 14, to the store 4, said bus 14 comprising a 8-bit data bus, a 4-bit control bus, and an at least a 16-bit address bus.

The front-end device, CPU 3, integrated store 4, power supply lines 10 and 12 and buses 13 and 14 are assembled on a single control card 7, of a printed circuit type to which said connector 8 is coupled through the lines 9 and 10, and said interface connector 2 is coupled through the coupling line 5.

Thus, this very simple circuit together with the small capability store means necessary for processing data can be easily implemented in fully integrated form, thereby greatly reducing the size of the inventive device, which can be integrated on a single chip, and directly assembled in a conventional ECU, designed for motor vehicle use.

Thus, such an integrated on-board device can process operating data by a novel process, to be disclosed hereinafter, thereby also improving the control method of the motor vehicle single subsystems.

Figure 2:
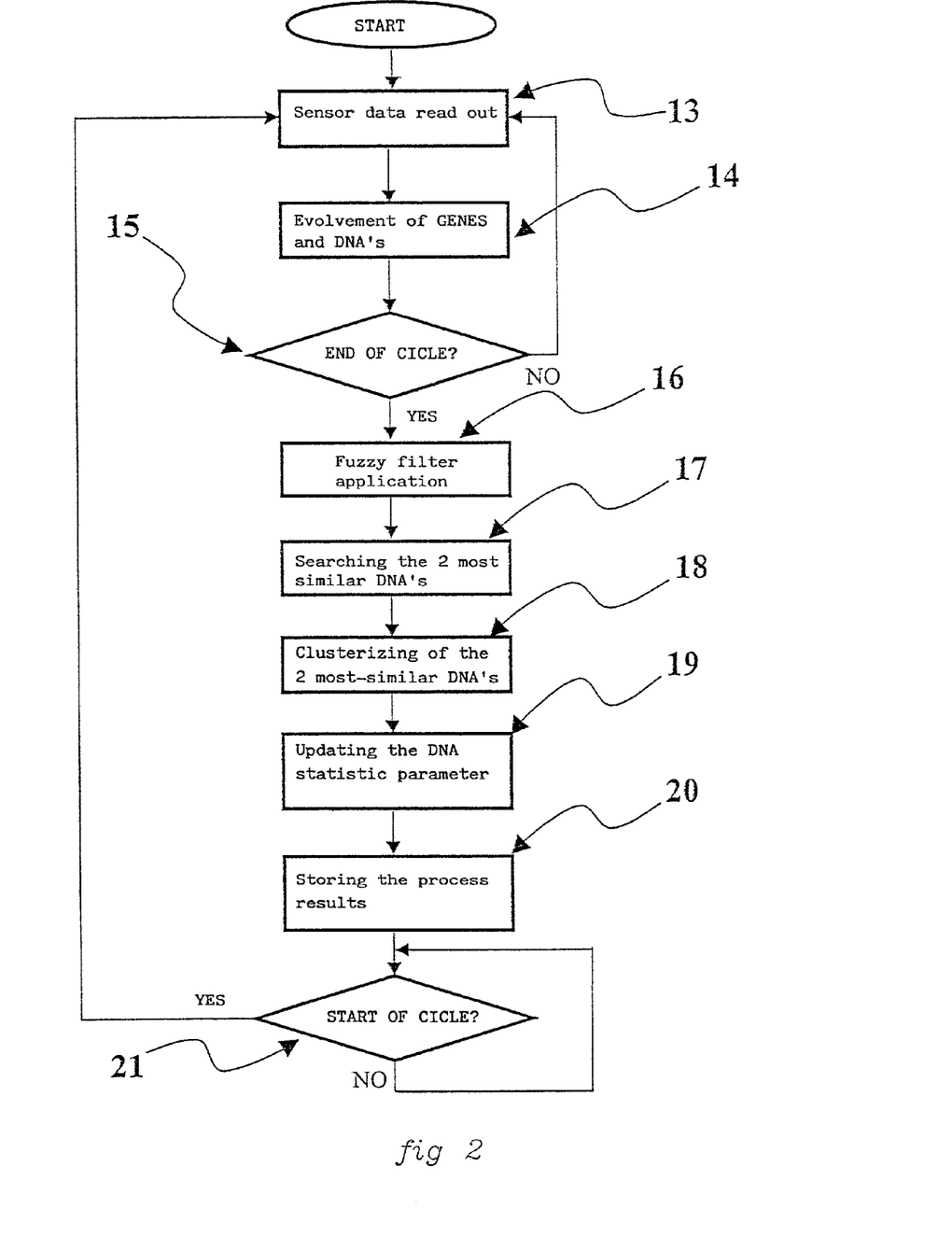
FIG. 2 illustrates a flow-chart related to the software algorithm implemented in fuzzy logic.

The control method for processing information from the shared network (CAN or TTP network) or from the direct connection (K line) is shown in FIG. 2, and is related to an information field which can be considered as included in an artificial intelligence field pattern, in particular of a so-called "genetic algorithm construction", similar to a method for generating and selecting solutions in animal or vegetable species.

More specifically, the inventive method comprises two reiterating cycles, one nested into the other.

The inner cycle of said cycles provides DNA genes, whereas the outer cycle selects said genes according to a fuzzy logic, collects two of the most similar DNA's, updates them and stores the method results.

In our application field, said genes represent statistic parameters, whereas a DNA essentially represents a parameter matrix and a synthetic frame, defining a user type or a motor vehicle use type condition.

Figure 3:
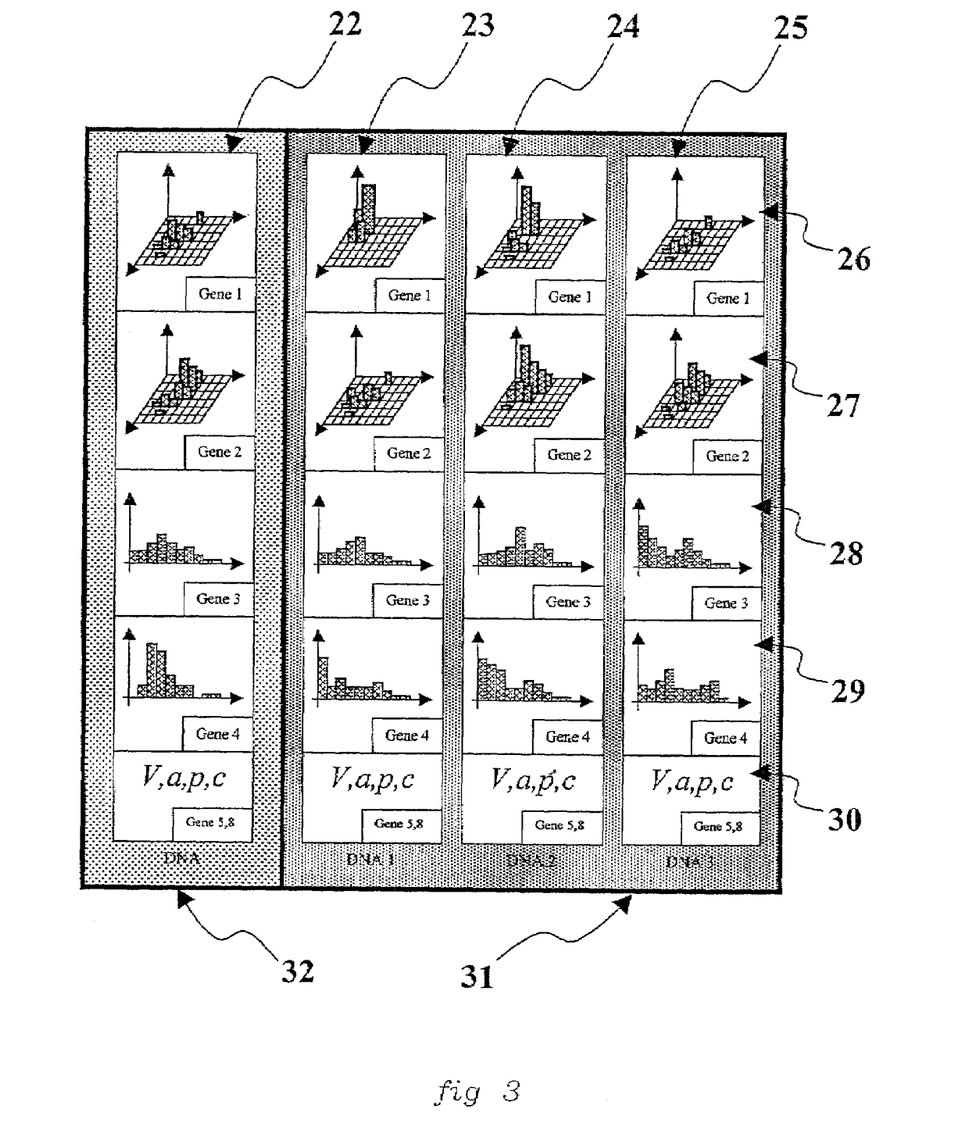
FIG. 3 illustrates a possible diagram of using store means included in the device according to the present invention.

FIG. 3 shows a possible procedure of mapping the store means to store therein said genes and their DNA combinations.

The columns indicated by the reference numbers 22, 23, 24, 25 represent store portions allocated for the DNA's.

The shown DNA's are all defined by eight genes.

The definition of a DNA is characterized by the structure thereof, and not by its contents.

The rows indicated by the reference numbers 26 and 27 comprise discrete DNA genes and represent multidimensional statistic parameters, for example clustered distributions.

The rows 28 and 29 comprise simple unidimensional distributing gene examples, whereas the row 30 comprises parametric genes, such as average values or standard offsets thereof.

Each DNA is constituted in the gene generating step, i.e. in performing the innermost reiterating cycle of the method, for evaluating data based on statistic parameters to be formed.

An essential parameter of this dynamically patterned method step is the condition to be applied for exiting the inner reiterating cycle, i.e. the so-called end-off-cycle condition, which sets that particular situation for which the DNA can be considered as fully formed.

For example, if it is necessary to typicize the motor vehicle kinematic use, then a gene can be represented by a clustered speed and acceleration distribution, and the end of cycle condition could be the joined condition of zero speed and low temperature of the engine.

As the innermost reiterating cycle arrives at an end of cycle condition, the genes are started to be filtered, according to selective criteria set by a fuzzy inference system, to clean the gene "image" from the zero-interest regions.

Then, a further analysis is performed to perform a data clustering operating step.

This means that, as indicated by the reference number 32, a novel DNA is formed and associated, as an additional information, with the DNA's in the remaining part of the store, i.e. the store portion 31.

The herein provided use of a fuzzy logic derives from the requirement of filtering genes in a quick, direct and flexible manner, to determine a continuous weight function in the measured data domainr or in a data linear combination domain, without performing transforms.

As is known, the calculation complexity greatly increases in calculating a transform operator, and an optional reverse transform operator, or anti-transformation operator, for performing domain changes.

Thus, since the invention allows us to remain in the data domain, it is advantageously possible to perform a clean windowing of genes, to prevent non interesting domain regions for negatively affecting the DNA's processing verification steps.

Figure 9:
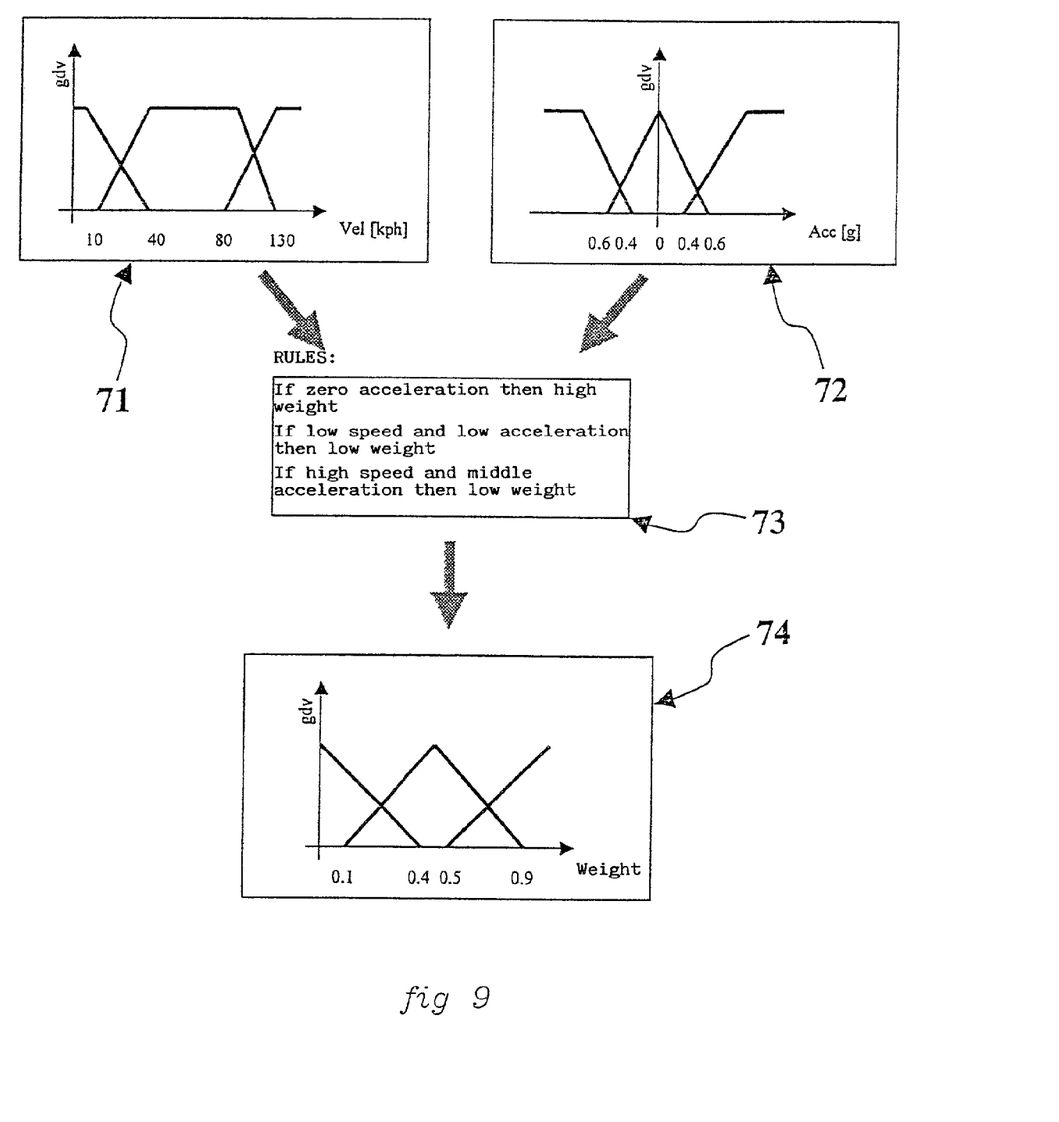
FIG. 9 illustrates a principle diagram of a fuzzy filter as implemented by the subject operating algorithm.

FIG. 9 shows a conceptual diagram of the application of the fuzzy-logic filter, in which, as a gene, a clustered motor vehicle speed-acceleration distribution has been selected.

For enhancing the region characterized by a zero acceleration it is sufficient to fuzzyfy the respective speed 71, acceleration 72 and weight 74 function of the rule assembly 73 defining the fuzzy inference the filter function structure is derived from the obtained weight function will be a normalized function, the value of which would be always included between 0 and 1, since it is a speed and acceleration function.

Upon detecting the most-similar DNA's, the data processing method will cluster them by generating a new DNA, as obtained for a weight combination of the two most similar DNA's.

Then the statistic parameters associated with the new DNA are updated, by clustering weight and dispersion values of the DNA's which have generated them.

Thus the device according to the present invention will also save information related to the DNA weight, and dispersion and sequence thereof, i.e. the changing DNA sequence in the monitoring period.

Figure 4:
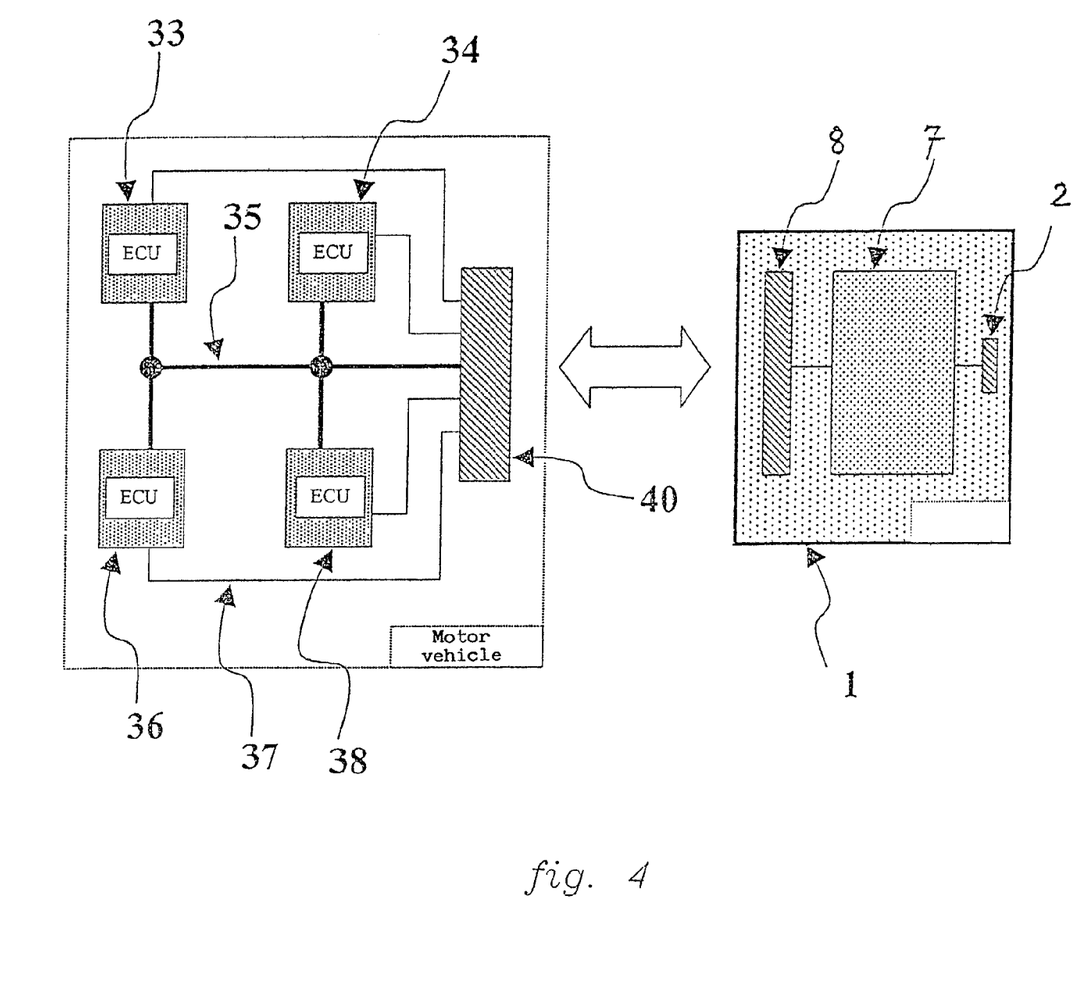
FIG. 4 illustrates a device according to the invention applied outside of a motor vehicle.

As a latter method step, the device 1 continuously provides a processing weight for a new operating cycle to form a new evolving DNA pattern considering that motor vehicle makers conventionally use a connector 40, the so-called OED or EOBD, or other like connector, for interfacing with the outside of the motor vehicle shared networks, and accessing the on-board electric system for communicating with an outer unit the diagnostic information through the shared networks or direct connections, FIG. 4 shows a typical architecture of the on-board electronic systems, in which the ECU's 33, 34, 36, 38 are coupled to one another through the shared network 35 or direct connections 37.

Figure 5:
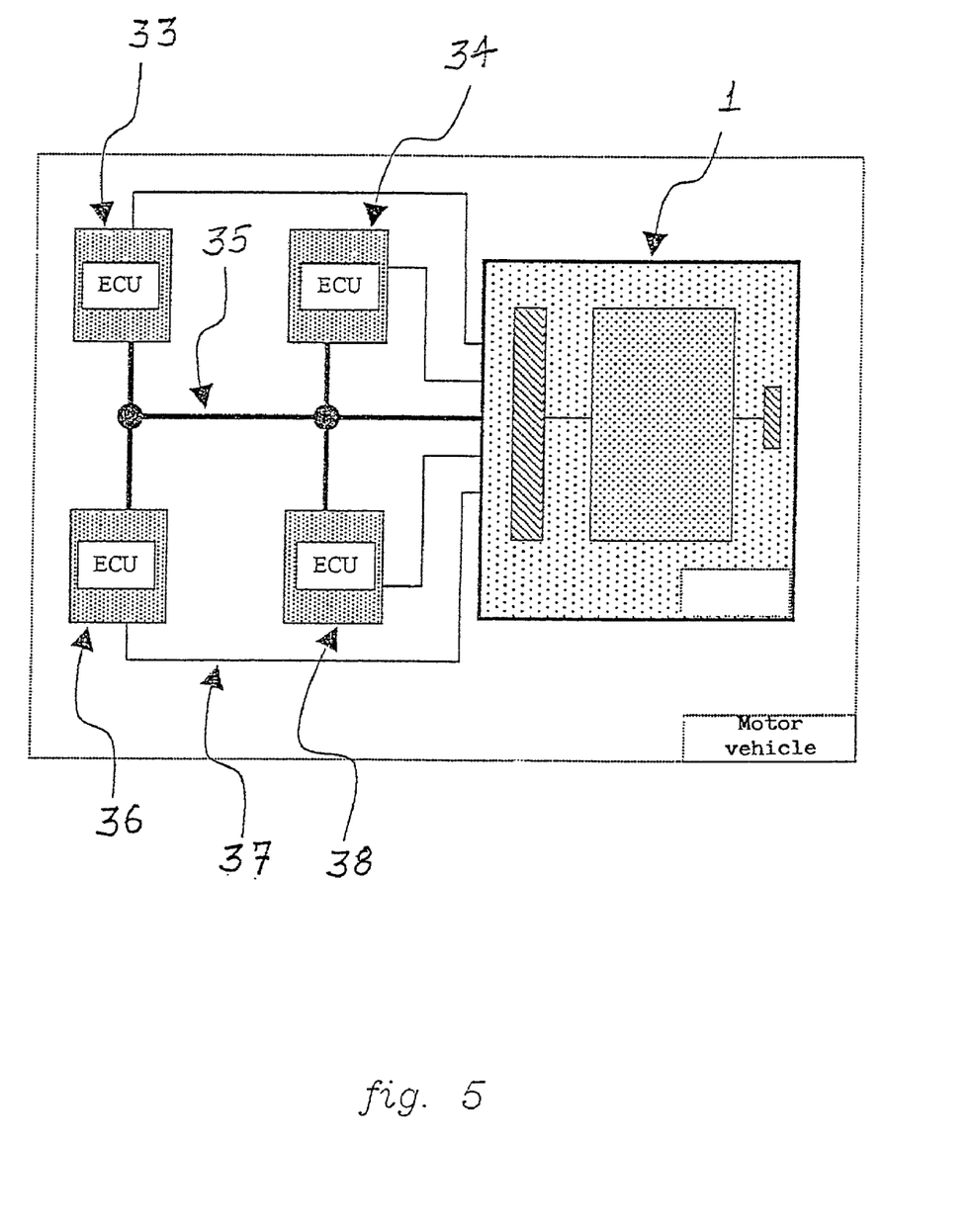
FIG. 5 illustrates a device according to the present invention applied inside or on-board of the motor vehicle.
Figure 6:
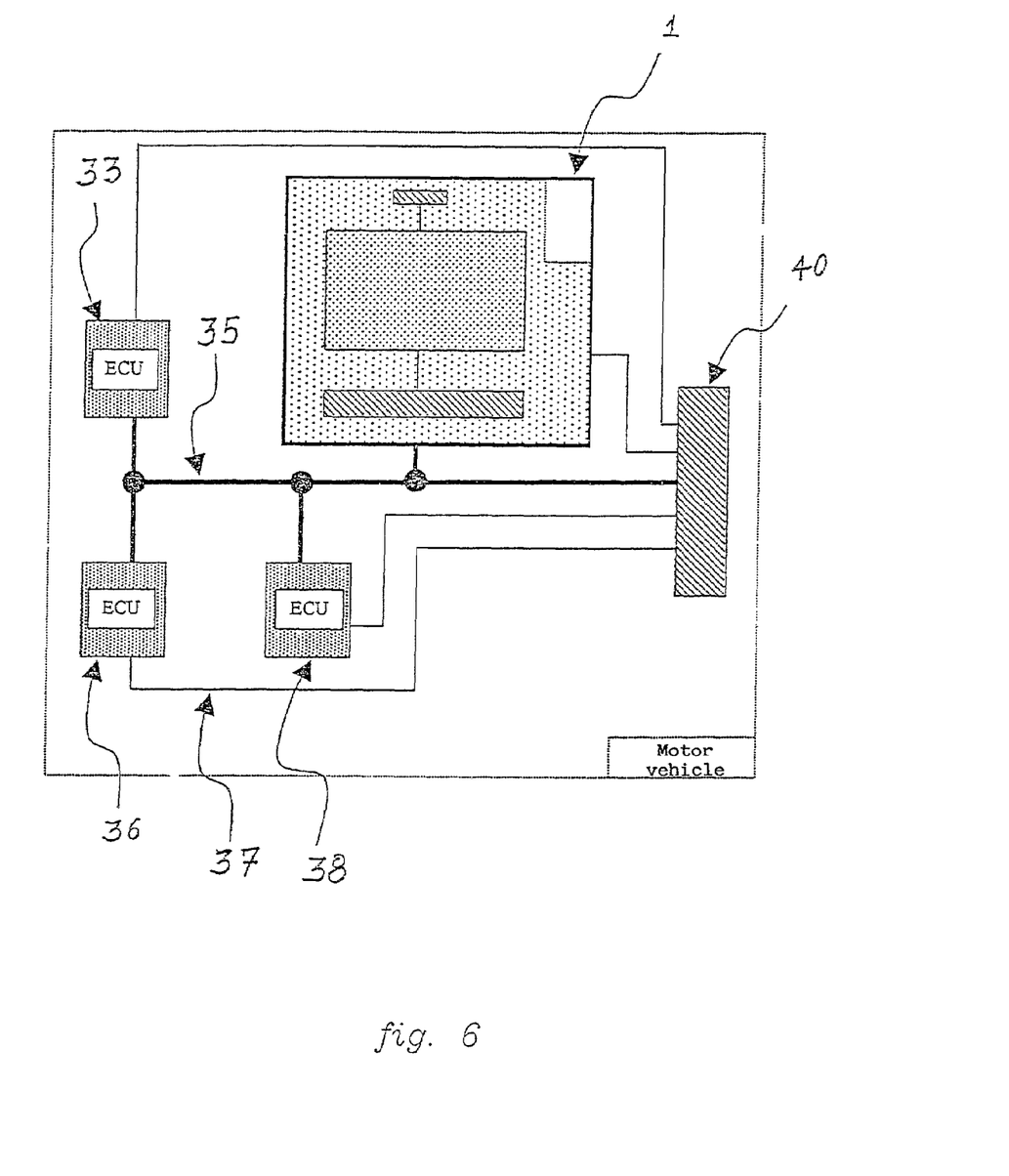
FIG. 6 illustrates a possible application of the device according to the present invention in replacement of an ECU.

The device 1 of the invention can be coupled in a fixed manner, as shown in FIG. 5, to become an integrating portion of the on-board electronic system and operate as an analyzer of the motor vehicle mode of use, to either provide the performed analyses to the other ECU's 33, 34, 36, 38 to take required strategic decisions, or it can store the analysis results in its store means for performing yet other subsequent analyses.

Alternatively, as is shown in FIG. 1, the device 1 can be interfaced, while preserving the same capabilities, with sensors and actuators in replacement of any desired dedicated ECU's of a motor vehicle specific subsystem, while providing useful parameters for identifying the motor vehicle modes of operation, to further enhance the parameters the conventional control procedures are based upon.

For example, the device can be used for improving an ABS arrangement operation, by adding to its standard parameter set the motor vehicle tire wearing condition.

Moreover, the device can also be applied to change the motor vehicle engine control procedures based on the use driver of the engine to minimize the fuel consume and pollution, or provide information related to the wear condition of mechanical members or engine lubricating oil.

Figure 7:
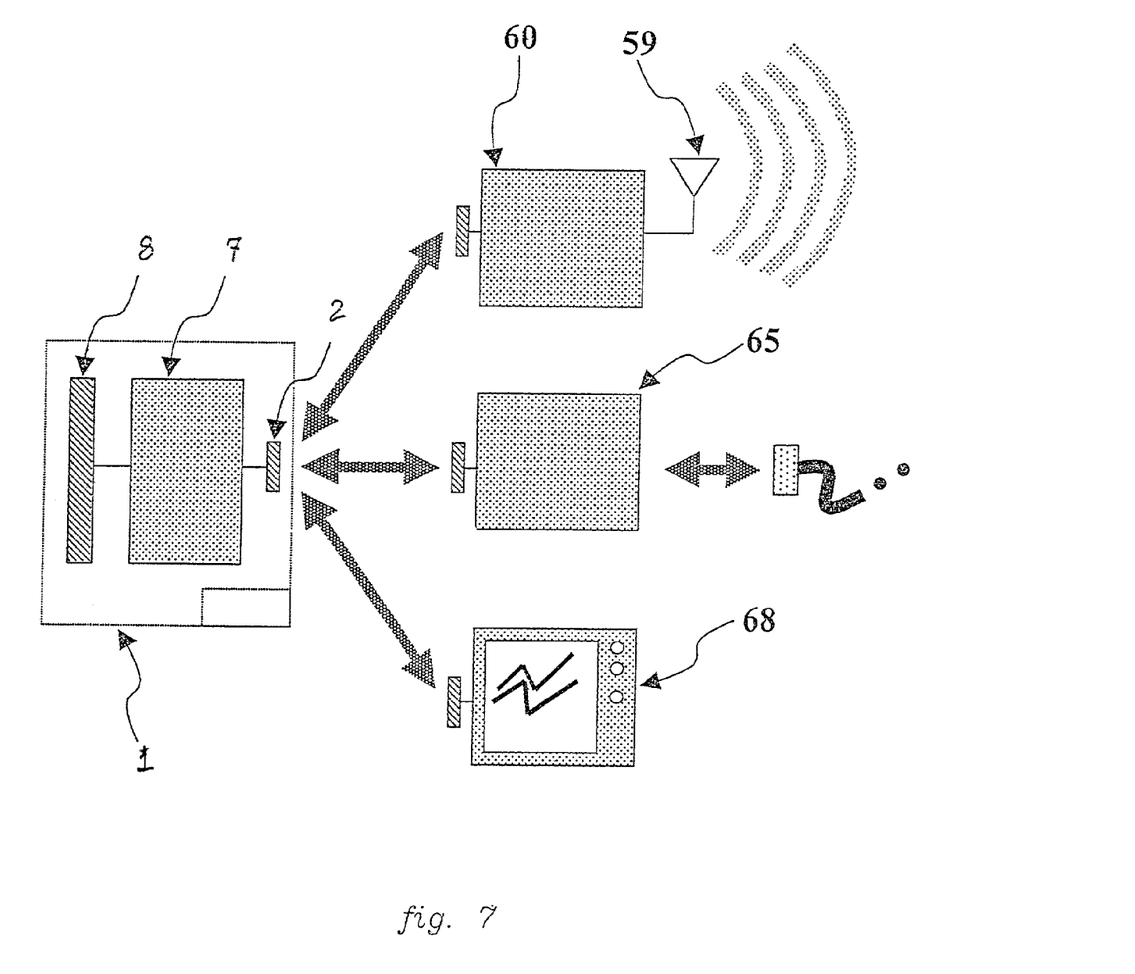
FIG. 7 illustrates a circuit diagram for coupling the device according to the present invention to further auxiliary devices.

As stated the connector 2 provides connection with optional peripheral devices, for example an outer auxiliary processing unit 68 for sharing and plotting data, such as a personal computer or a palmar device, or, as shown in FIG. 7, a radio transmitter 60 or a wireless unit including an antenna 59 or an Ethernet adapter 65 for LAN networks, or other similar devices, of a standalone pattern, or associated with dedicated nets.

From the above disclosure it should be apparent that the invention fully achieves the intended objects.

The invention, as disclosed, is susceptible to several modifications and variations, all coming within the scope of the inventive idea.

Moreover, all the constructional details can be replaced, the circuitry architectures included, by technically equivalent elements.

In practicing the invention, the used materials, as well as the contingent size and shapes, can be any, depending on requirements.

The invention claimed is:

1. An electronic device for monitoring and processing information data related to the use and functioning of motor vehicles through an inner network connecting vehicle sensors, said device comprising:
   a central processing unit (3);
   an integrated data storage (4) connected to the central processing unit; and
   a network connector (8) operatively connected to the central processing unit and configured to be connected to an inner network of a motor vehicle through a connector (40) used by motor vehicle makers for accessing a vehicle on-board electric system with a diagnostic unit,
   said device being a stand-alone device cooperating with the vehicle electronic dedicated control units, via said network connector and through said inner network, and processing information data related to use and functioning of the motor vehicle received through said network connector and the inner network from connected vehicle sensors,
   said data received through said inner network being processed by said central processing unit and performed analysis being stored into said storage (4);
   an interface connector (2) providing connection to one of a radio transmitter (6) and a wireless unit; and
   a front-end device (6) and a bus (13) connecting said network connector (8) to said central processing unit; and
   a further bus (14) connecting said central processing unit to said storage (4),
   wherein said device is coupled, through said on-board network connector (8), with one of an OBD- and an EOBD connector (40) for interfacing the motor vehicle inner networks with an outside network of said motor vehicle.

2. The device as in claim 1, further comprising:
   a power management system (11) supplied by a power supply circuit of the motor vehicle through said network connector (8) by said connector (40).

3. The device as in claim 1, further comprising an Ethernet adapter (65) for LAN networks.

4. The device as in claim 1, wherein said front-end device (6), said central processing unit (3), said storage (4) and said buses (13 and 14) are assembled on a single printed circuit board card (7).

5. The device as in claim 1, wherein said device is directly interfaced with the sensors and with actuators, to provide enhanced operating parameters including statistical parameters defining usage procedures of motor vehicle sub-systems.

6. The device as in claim 1, wherein said storage (4) is mapped so as to store information data in genes and DNA combinations thereof.

7. The device as in claim 4, wherein said interface, connector (2) and said onboard network connector (8) are coupled with said printed board circuit card through a coupling line (5).

8. The device as in claim 6, wherein said information data are clustered into parameter genes and the parameter genes are in turn clustered into parameter matrix DNAs defining one of a user type and a motor vehicle use type.

9. An electronic device for monitoring and processing information data related to the use and functioning of motor vehicles through an inner network connecting vehicle sensors, said device comprising:
a central processing unit (3);
an integrated data storage (4) connected to the central processing unit; and
a network connector (8) operatively connected to the central processing unit and configured to be connected to an inner network of a motor vehicle through a connector (40) used by motor vehicle makers for accessing a vehicle onboard electric system with a diagnostic unit,
said device being a stand-alone device cooperating with the vehicle electronic dedicated control units, via said network connector and through said inner network, and processing information data related to use and functioning of the motor vehicle received through said network connector and the inner network from connected vehicle sensors,
said data received through said inner network being processed by said central processing unit and performed analysis being stored into said storage (4); and
an interface connector (2) providing connection to one of a radio transmitter (6) and a wireless unit, wherein said on-board network connector (8) is connected to the inner network through one of CAN, TTP and direct connections on a K-line.

10. The device as in claim 9 further comprising:
a front-end device (6) and a bus (13) connecting said network connector (8) to said central processing unit; and
a further bus (14) connecting said central processing unit to said storage (4).

11. The device as in claim 9, further comprising:
a power management system (11) supplied by a power supply circuit of the motor vehicle through said network connector (8) by said connector (40).

12. The device as in claim 9, further comprising an Ethernet adapter (65) for LAN networks.

13. The device as in claim 9, wherein said storage (4) is mapped so as to store information data in genes and DNA combinations thereof.

14. The device as in claim 10, wherein said front-end device (6), said central processing unit (3), said storage (4) and said buses (13 and 14) are assembled on a single printed circuit board card (7).

15. The device as in claim 10, wherein said device is directly interfaced with the sensors and with actuators, to provide enhanced operating parameters including statistical parameters defining usage procedures of motor vehicle sub-systems.

16. The device as in claim 14, wherein said interface connector (2) and said on-board network connector (8) are coupled with said printed board circuit card through a coupling line (5).

17. The device as in claim 13, wherein said information data are clustered into parameter genes and the parameter genes are in turn clustered into parameter matrix DNAs defining one of a user type and a motor vehicle use type.

18. An electronic device for monitoring and processing data related in the use and functioning of motor vehicles, said device comprising:
a central processing unit (3) connected to an integrated storage (4), to a power management system and to a network connector (8),
the network connector configured to be connected to an inner network of a motor vehicle,
said central processing unit configured to receive information data relating to the motor vehicle from vehicle sensors through said inner network and to process the received information data into clustered statistical parameters,
wherein said storage (4) is mapped so as to store the information data in genes and DNA combinations thereof,
wherein said information data are formed as statistical distributions into genes and the genes are in turn clustered into parameter matrix DNAs defining one of a user type and a motor vehicle use type.

19. The electronic device as in claim 18, wherein said genes represent statistical data of the group consisting of multi-dimensional statistical parameters, one-dimensional statistical parameters and single parameters.

20. The electronic device as in claim 18, wherein said storage (4) comprises a store portion (31) where DNAs are stored and another portion (32) where a new DNA is formed through clustering two most similar DNAs.

21. An analysis method to be performed in a device as in claim 18, wherein information data relating to the use mode of the motor vehicle are processed in a central processing unit (3) and stored in storage (4), wherein said data are clustered in a genetic construction identifying a usage mode of said motor vehicle according to the following steps:
genes are generated as statistical distributions of said information data,
genes are constituted in parameter matrix DNAs, and
said DNAs are stored in the storage (4).

22. The analysis method as in claim 21, wherein a further clustering step is provided, by which matrix DNAs are clustered into said storage (4).

23. The analysis method as in claim 21, wherein a generation and evolution of said genes and a unification thereof into said DNAs is made through algorithmic instruments of artificial intelligence.

24. The analysis method as in claim 22, wherein said clustering is made by way of a filtering algorithm.

25. The analysis method as in claim 22, comprising a unification step wherein two most-similar DNAs are unified generating a new updated DNA which is stored in said storage (4).

26. The analysis method as in claim 24, wherein said algorithm is a fuzzy logic algorithm.

27. The analysis method as in claim 25, wherein said data are processed through an algorithm implementing at least two reiterative nested cycles, an inner cycle for providing said genes and building said DNAs, and an outer cycle performing said unification step.

28. The analysis method as in claim 27, wherein said outer cycle is based on a fuzzy logic of said genes.

29. The analysis method as in claim 28, wherein said fuzzy logic provides to filter said genes in a direct manner in a domain of measured data, by fuzzyfying said genes (71, 72), and provides a weight function (74) by fuzzy rules (73) for deriving normalized filter functions and starting gene functions.

30. An electronic device for monitoring and processing data related to use and functioning of motor vehicles, said device comprising:
- a central processing unit (3);
- an integrated storage (4); and
- a network connector (8) for connection to an inner network of a motor vehicle including sensor electronic dedicated control units,
- wherein said central processing unit is to receive information data relating to the motor vehicle from said sensor electronic dedicated control units through said inner network and is to process the received information data into statistical distributions, and
- wherein said storage (4) is mapped so as to store said statistical distributions into genes and DNA arrays,
- wherein said information data are formed as statistical distributions into genes and the genes are in turn clustered into parameter matrix DNAs defining one of a user type and a motor vehicle use type.

31. An analysis method to be performed in a device as in claim 30, wherein information data received from the sensor electronic dedicated control units of said inner network of the vehicle are processed in the central processing unit (3) and stored in storage (4), wherein the following steps are provided:
- forming statistical distributions of said information data and generating genes with said distributions,
- constituting said genes into DNA arrays, and
- storing said DNA arrays in said storage (4).

* * * * *